United States Patent
Kurebayashi

(10) Patent No.: US 12,461,131 B2
(45) Date of Patent: Nov. 4, 2025

(54) DEVICE INSPECTION APPARATUS AND DEVICE INSPECTION METHOD

(71) Applicant: Tokyo Electron Limited, Tokyo (JP)

(72) Inventor: Shinya Kurebayashi, Yamanashi (JP)

(73) Assignee: Tokyo Electron Limited, Tokyo (JP)

( * ) Notice: Subject to any disclaimer, the term of this patent is extended or adjusted under 35 U.S.C. 154(b) by 157 days.

(21) Appl. No.: 18/554,666

(22) PCT Filed: Apr. 8, 2022

(86) PCT No.: PCT/JP2022/017349
§ 371 (c)(1),
(2) Date: Oct. 10, 2023

(87) PCT Pub. No.: WO2022/224843
PCT Pub. Date: Oct. 27, 2022

(65) Prior Publication Data
US 2024/0192257 A1    Jun. 13, 2024

(30) Foreign Application Priority Data

Apr. 22, 2021 (JP) .................................. 2021-072503

(51) Int. Cl.
*G01R 27/08* (2006.01)
(52) U.S. Cl.
CPC .................... *G01R 27/08* (2013.01)
(58) Field of Classification Search
CPC ........ G01R 31/26; G01R 31/28; G01R 15/09; G01R 27/08
See application file for complete search history.

(56) References Cited

U.S. PATENT DOCUMENTS

| | | | |
|---|---|---|---|
| 5,543,728 A | 8/1996 | Grace et al. | |
| 6,255,842 B1* | 7/2001 | Hashimoto | G01R 31/3004 324/762.02 |
| 2006/0244433 A1* | 11/2006 | Nakahara | G01R 31/30 324/76.11 |
| 2014/0009129 A1* | 1/2014 | Shimizu | G05F 1/575 323/234 |

(Continued)

FOREIGN PATENT DOCUMENTS

| | | |
|---|---|---|
| JP | S63-135881 | 6/1988 |
| JP | 2001-041997 | 2/2001 |

(Continued)

*Primary Examiner* — Thang X Le
(74) *Attorney, Agent, or Firm* — IPUSA, PLLC

(57) ABSTRACT

A device inspection apparatus includes a voltage source that applies a voltage to a device to be inspected, a plurality of resistors connected in series between the voltage source and the device, a detector that detects a potential difference across both ends of a resistor group that includes one or more resistors among the plurality of resistors, a switching device that switches the resistor group from which the detector detects the potential difference among the plurality of resistors, and a controller. The controller controls the detector and the switching device, so as to detect a potential difference across both ends of at least two or more different resistor groups, and controls the detector and the switching device to detect the potential difference in an ascending order of a combined resistance value between both ends of the at least two or more resistor groups.

11 Claims, 6 Drawing Sheets

(56) References Cited

U.S. PATENT DOCUMENTS

2020/0011928 A1\* 1/2020 Mücke .................... G05F 1/575
2020/0127624 A1\* 4/2020 Basilico ............. G01R 19/0092

FOREIGN PATENT DOCUMENTS

| JP | 2005-167429 | 6/2005 |
| JP | 2010-508536 | 3/2010 |
| WO | 99/28756 | 6/1999 |

\* cited by examiner

DEVICE INSPECTION APPARATUS AND DEVICE INSPECTION METHOD

TECHNICAL FIELD

The present disclosure relates to device inspection apparatuses and device inspection methods.

BACKGROUND ART

There is known a device inspection apparatus that inspects a device that is to be inspected by applying a voltage to the device (refer to Patent Document 1, for example). In Patent Document 1, the inspection is performed by switching power supply circuits connected in parallel according to a preset range of a measured current.

PRIOR ART DOCUMENTS

Patent Documents

Patent Document 1: Japanese Laid-Open Patent Publication No. 2001-41997

DISCLOSURE OF THE INVENTION

Problem to be Solved by the Invention

The present disclosure provides a technique capable of inspecting device characteristics in a short time, regardless of a state of the device that is to be inspected.

Means of Solving the Problem

According to one aspect of the present disclosure, a device inspection apparatus includes a voltage source configured to apply a voltage to a device to be inspected; a plurality of resistors connected in series between the voltage source and the device; a detector configured to detect a potential difference across both ends of a resistor group that includes one or more resistors among the plurality of resistors; a switching device configured to switch the resistor group from which the detector detects the potential difference among the plurality of resistors; and a controller, wherein the controller is configured to control the detector and the switching device, so as to detect a potential difference across both ends of at least two or more different resistor groups, and is configured to control the detector and the switching device to detect the potential difference in an ascending order of a combined resistance value between both ends of the at least two or more resistor groups.

Effects of the Invention

According to the present disclosure, the device characteristics can be inspected in a short time, regardless of the state of the device that is to be inspected.

MODE OF CARRYING OUT THE INVENTION

Figure 1:
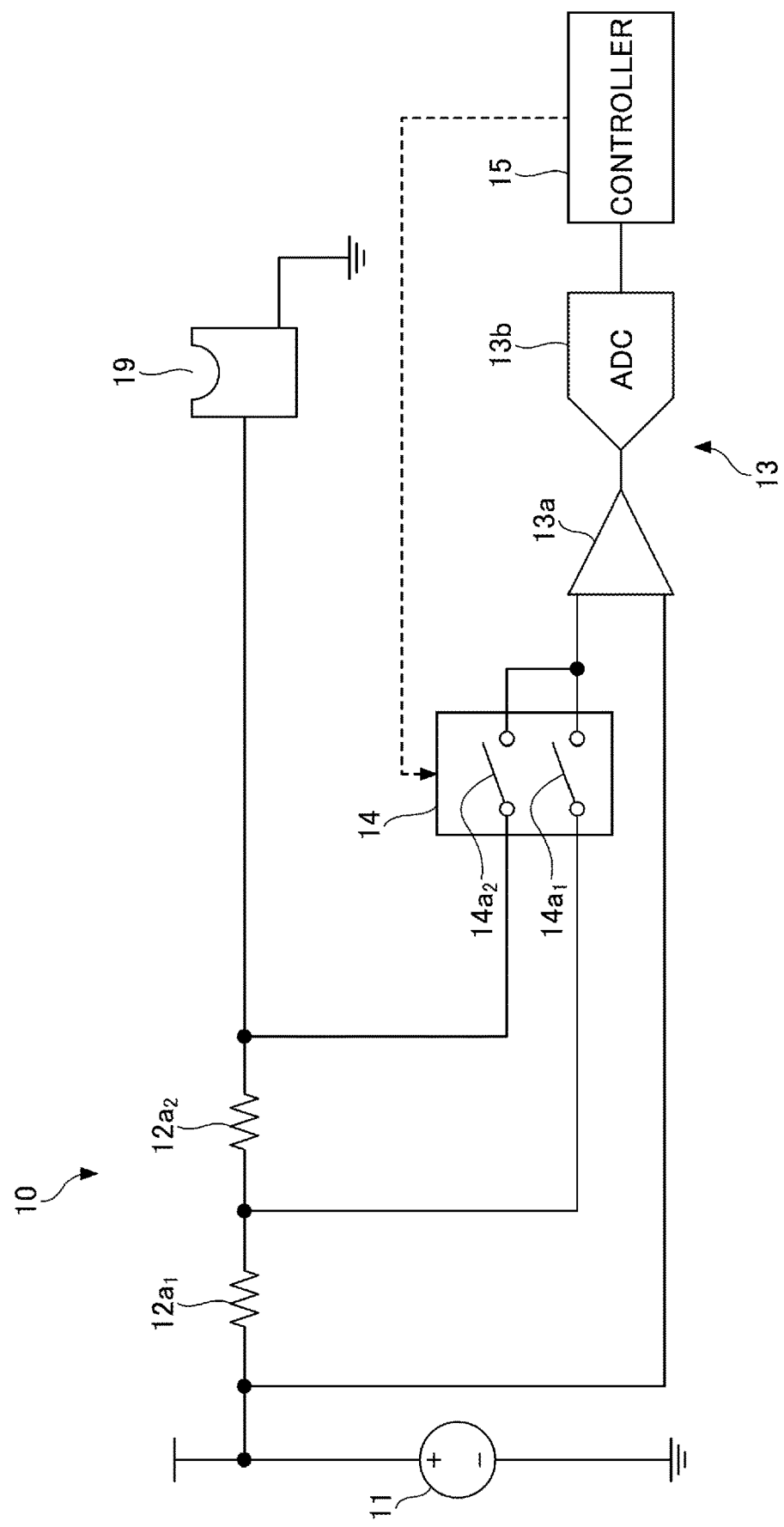
FIG. 1 is a diagram illustrating an example of an electric circuit of a device inspection apparatus according to a first embodiment.

Non-limiting embodiments of the present disclosure will now be described with reference to the accompanying drawings. In all of the accompanying drawings, the same or corresponding members or components are designated by the same or corresponding reference numerals, and a redundant description thereof will be omitted.

First Embodiment

Device Inspection Apparatus

An example of a device inspection apparatus according to a first embodiment will be described, with reference to FIG. 1. The device testing apparatus according to the first embodiment inspects various electrical characteristics by applying a voltage to a semiconductor device that is to be inspected (DUT: Device Under Test).

A device inspection apparatus 10 includes a voltage source 11, resistors $12a_1$ and $12a_2$, a detector 13, a switching device 14, a controller 15, or the like.

The voltage source 11 applies a voltage set by a user (hereinafter referred to as a "set voltage") to a DUT 19. Varying the set voltage, and switching the voltage source 11 between on and off states, are controlled by the controller 15. The voltage source 11 can be a programmable DC voltage source, for example.

The resistors $12a_1$ and $12a_2$ are connected in series with respect to the DUT 19. That is, the resistors $12a_1$ and $12a_2$ are connected in series between the voltage source 11 and the DUT 19. The resistor $12a_1$ is provided on the side of the voltage source 11, and the resistor $12a_2$ is provided on the side of the DUT 19. Resistance values of the two resistors $12a_1$ and $12a_2$ may be the same, or may be different.

The detector 13 detects a potential difference across both ends of the resistor $12a_1$, and a potential difference across both ends of the resistors $12a_1$ and $12a_2$. That is, the detector 13 detects the potential difference that is generated when a current supplied to the DUT 19 flows through the resistor $12a_1$, and a potential difference that is generated when the current supplied to the DUT 19 flows through the resistors $12a_1$ and $12a_2$. The detector 13 includes an amplifier 13a, an AD converter 13b, or the like.

The amplifier 13a is connected between the switching device 14 and the AD converter 13b. The amplifier 13a amplifies the potential difference between the voltage source 11 side of the resistor 12a, and the DUT 19 side of the resistor $12a_1$ or the potential difference between the voltage source 11 side of the resistor $12a_1$ and the DUT 19 side of the resistor $12a_2$, and outputs the amplified potential difference to the AD converter 13b. That is, the amplifier 13a amplifies the potential difference across both ends of the resistor $12a_1$, or the potential difference across both ends of the resistors $12a_1$ and $12a_2$, and outputs the amplified potential difference to the AD converter 13b. Hence, a small potential difference generated between both ends of the resistor $12a_1$ or between both ends of the resistors $12a_1$ and $12a_2$ is amplified and output to the AD converter $13b$. As a result, a detection accuracy of the potential difference improves. The amplifier $13a$ may be a current sense amplifier, for example.

The AD converter $13b$ is connected between the amplifier $13a$ and the controller 15. The AD converter $13b$ converts the potential difference amplified by the amplifier $13a$ into a digital signal, and outputs the digital signal to the controller 15.

The switching device 14 switches a resistor group (the resistor $12a_1$, or the resistors $12a_1$ and $12a_2$) from which the potential difference is to be detected by the detector 13 that detects the potential difference from the two resistors $12a_1$ and $12a_2$. The switching device 14 includes two switches $14a_1$ and $14a_2$. The switch $14a_1$ switches a connection state between the DUT 19 side of the resistor $12a_1$ and the amplifier $13a$. The switch $14a_2$ switches a connection state between the DUT 19 side of the resistor $12a_2$ and the amplifier $13a$.

For example, in a case where the current supplied to the DUT 19 is relatively large, the switch $14a_1$ is switched on and the switch $14a_2$ is switched off. In this state, the amplifier $13a$ amplifies the potential difference across both ends of the resistor $12a_1$, that is, a potential difference generated by the current flowing through the resistor $12a_1$. In addition, in a case where the current supplied to the DUT 19 is relatively small, for example, the switch $14a_1$ is switched off and the switch $14a_2$ is switched on. In this state, the amplifier $13a$ amplifies the potential difference across both ends of the resistors $12a_1$ and $12a_2$, that is, a potential difference generated by the current flowing through the resistors $12a_1$ and $12a_2$. The switching of the on and off states the switches $14a_1$ and $14a_2$ is controlled by the controller 15.

The controller 15 is a computer, for example, and controls operations of the voltage source 11, the detector 13, the switching device 14, or the like. The controller 15 transmits a control signal for switching on and off states of the voltage source 11, and a control signal for varying the set voltage, to the voltage source 11. The control signals are generated according to a voltage value preset by the user. In addition, the controller 15 transmits a control signal for switching the on and off states of the switches $14a_1$ and $14a_2$ to the switching device 14. This control signal is generated according to a range of a current to be measured, preset by the user. In addition, the controller 15 transmits a control signal to the detector 13 and the switching device 14, so as to detect the potential difference of the resistor groups (the resistor $12a$), and the resistors $12a_1$ and $12a_2$) in an ascending order of a combined resistance value between both ends of the resistor group. That is, after detecting the potential difference across both ends of the resistor $12a_1$, the controller 15 transmits the control signal to the detector 13 and the switching device 14 so as to detect the potential difference across both ends of the resistors $12a_1$ and $12a_2$.

Device Inspection Method

Figure 2:
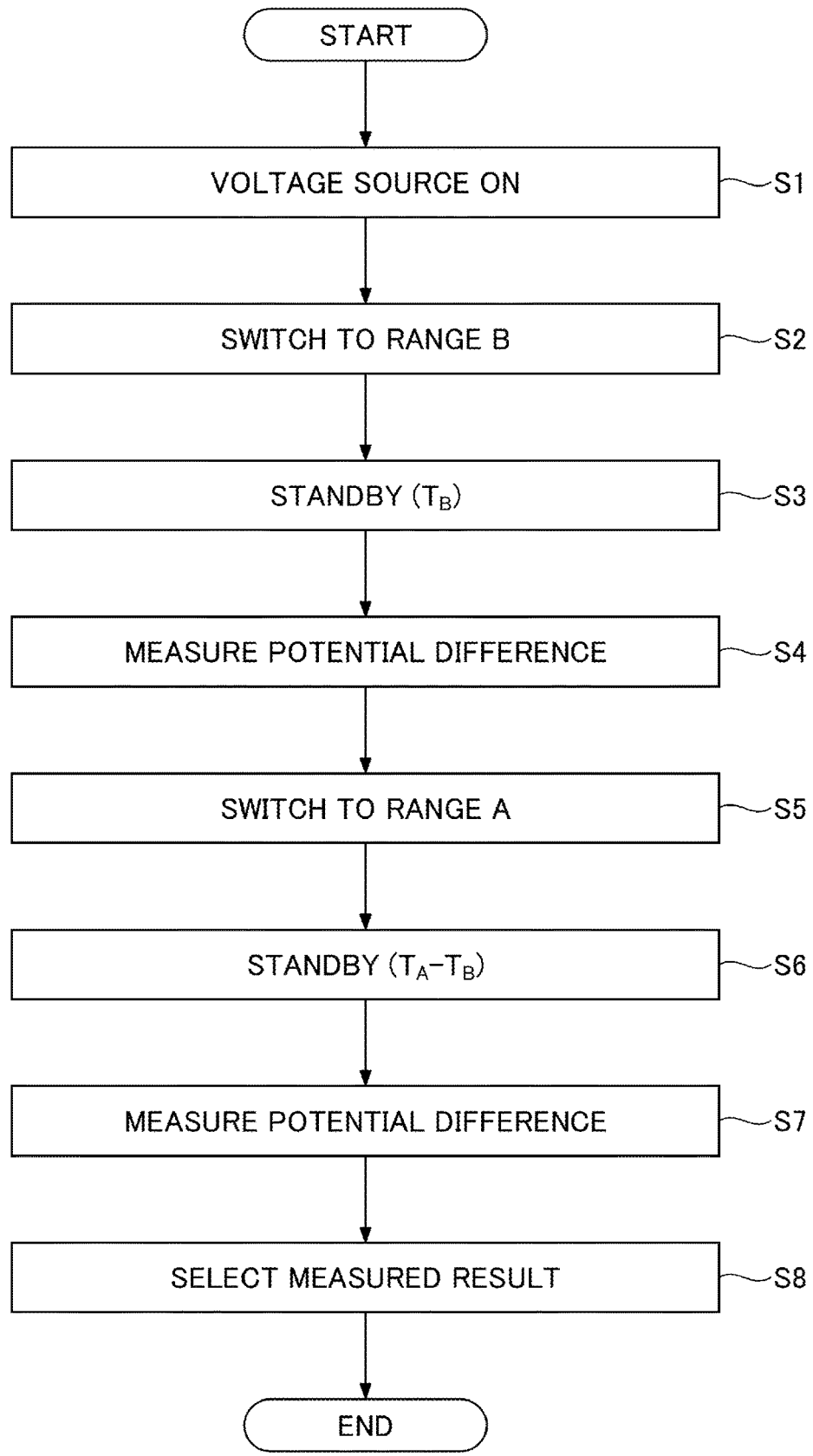
FIG. 2 is a flow chart illustrating an example of an operation of the device inspection apparatus of FIG. 1.
Figure 3:
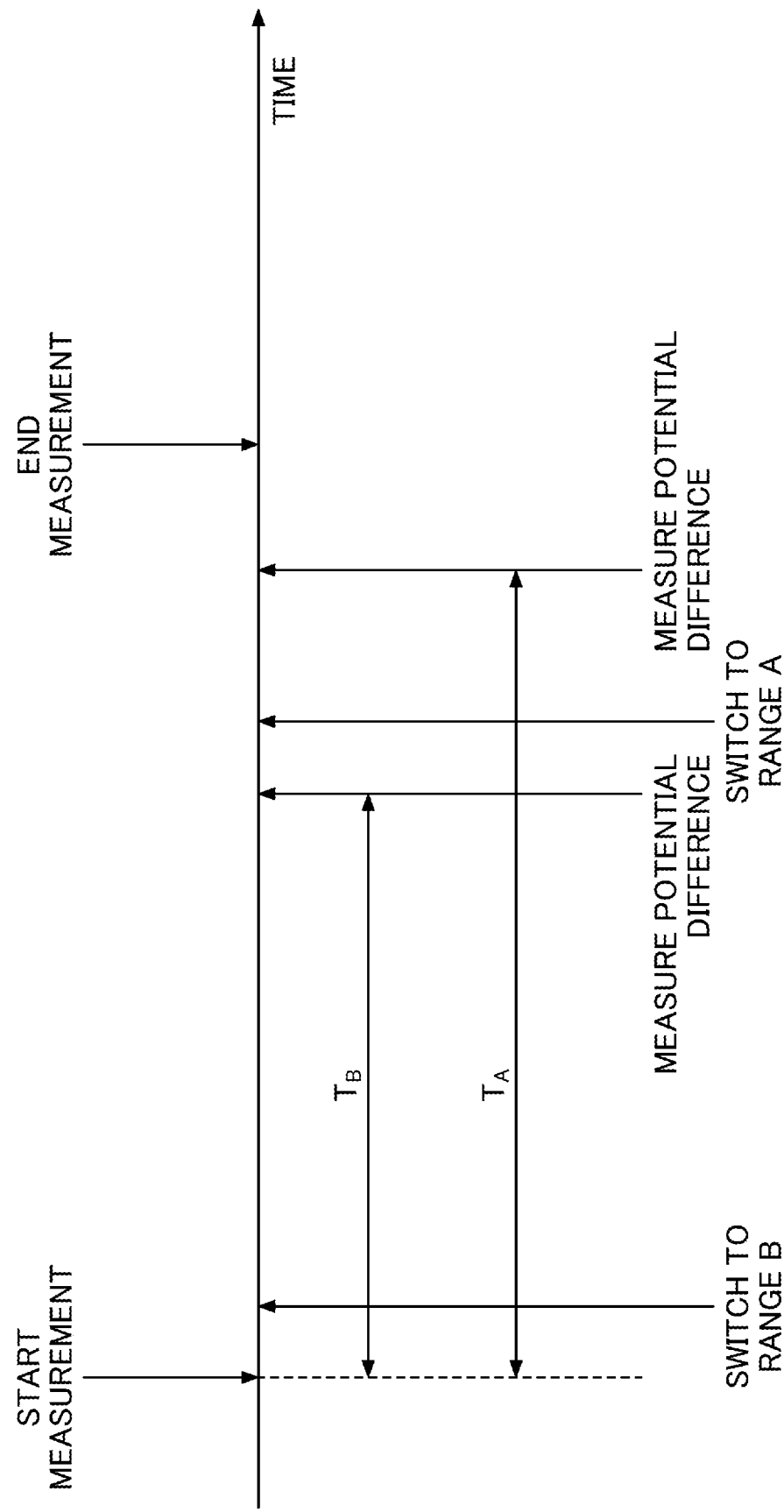
FIG. 3 is a timing chart illustrating an example of the operation of the device inspection apparatus of FIG. 1.

A device inspection method according to the first embodiment will be described for an example in which the DUT 19 is inspected by the device inspection apparatus 10 illustrated in FIG. 1, by referring to FIG. 2 and FIG. 3.

First, in step S1, the controller 15 switches on the voltage source 11, so that the set voltage is applied to the DUT 19. Hence, a current is supplied to the DUT 19 and the resistors $12a_1$ and $12a_2$.

Next, in step S2, the controller 15 controls the switching device 14 to switch a current range to a range B. The range B is the range that is selected in the case where the current supplied to the DUT 19 is relatively large. In the range B, the switch $14a_1$ is switched on and the switch $14a_2$ is switched off by the controller 15. Thus, the potentials between both ends of the resistor $12a_1$, that is, the potential on the voltage source 11 side of the resistor $12a_1$ and the potential on the DUT 19 side of the resistor $12a_1$, are input to the amplifier $13a$.

Next, in step S3, the controller 15 stands by and waits until a predetermined time Ty elapses from a time when the current starts to flow through the resistor $12a_1$. Because the current starts to flow through the resistor $12a_1$ from the time when the voltage source 11 is switched on in step S1, the time when the current starts to flow through the resistor $12a_1$ is the time when the voltage source 11 is switched on in step S1. The predetermined time $T_B$ is a time from the time when the current starts to flow through the resistor $12a_1$ to the time when a potential difference generated across both ends of the resistor $12a_1$ stabilizes. This time until the potential difference stabilizes depends on the resistance value of the resistor $12a_1$, and becomes longer as the resistance value of the resistor $12a_1$ becomes higher, and becomes shorter as the resistance value of the resistor $12a_1$ becomes lower. This is because the DUT 19, a wiring connecting the voltage source 11 and the DUT 19, or the like have capacitance components to a certain extent, and an electric circuit included in the device inspection apparatus 10 can be regarded as an RC circuit. A time constant $\tau$ of the RC circuit can be computed from $\tau = RC$ (where R denotes a resistance value of the electric circuit, and C denotes a capacitance value of the electric circuit), and when the resistance value of the resistor $12a_1$ increases, the value of R in the formula described above increases, and the time constant $\tau$ increases. The predetermined time $T_B$ may be longer than a time from the time when the current starts to flow through the resistor $12a_1$ until the time when the potential difference generated across both ends of the resistor $12a_1$ stabilizes.

Next, in step S4, the controller 15 controls the detector 13, so that the amplifier $13a$ amplifies the potential difference across both ends of the resistor $12a_1$, and the AD converter $13b$ converts the potential difference amplified by the amplifier $13a$ into the digital signal. Further, the controller 15 computes the current value supplied to the DUT 19, based on the digital signal obtained by the conversion performed by the AD converter $13b$.

Next, in step S5, the controller 15 controls the switching device 14 to switch the current range from the range B to a range A. The range A is selected in the case where the current supplied to the DUT 19 is relatively small. In the range A, the controller 15 switches the switch $14a_1$ off, and switches the switch $14a_2$ on. Hence, the potentials across both ends of the resistors $12a_1$ and $12a_2$, that is, the potential of the voltage source 11 side of the resistor $12a_1$ and the potential of the DUT 19 side of the resistor $12a_2$, are input to the amplifier $13a$.

Next, in step S6, the controller 15 stands by until a predetermined time $T_A$ elapses from a time when the current starts to flow through the resistors $12a_1$ and $12a_2$. Because the current starts to flow through the resistors $12a_1$ and $12a_2$ from the time when the voltage source 11 is switched on in step S1, the time when the current starts to flow through the resistors $12a_1$ and $12a_2$ is the time when the voltage source 11 is switched on in step S1. In step S6, the predetermined time $T_B$ has already elapsed at the time when the process of step S6 starts, because the voltage source 11 is switched on in step S1. For this reason, in step S6, the controller 15 stands by and waits until a predetermined time $T_A$-$T_B$ elapses. The predetermined time $T_A$ is a time from the time when the current starts to flow through the resistors $12a_1$ and $12a_2$ to the time when the potential difference generated across both ends of the resistors $12a_1$ and $12a_2$ stabilizes. This time until the potential difference stabilizes depends on the combined resistance value of the resistors $12a_1$ and $12a_2$, and becomes longer as the combined resistance value of the resistors $12a_1$ and $12a_2$ becomes higher, and becomes shorter as the combined resistance value of the resistors $12a_1$ and $12a_2$ becomes lower. The combined resistance value of the resistors $12a_1$ and $12a_2$ is higher than the resistance value of the resistor $12a_1$. For this reason, the predetermined time $T_A$ is longer than the predetermined time $T_B$.

Next, in step S7, the controller 15 controls the detector 13, so that the amplifier 13a amplifies the potential difference across both ends of the resistors $12a_1$ and $12a_2$, and the AD converter 13b converts the potential difference amplified by the amplifier 13a into the digital signal. Further, the controller 15 computes the current value supplied to the DUT 19, based on the digital signal obtained by the conversion performed by the AD converter 13b.

Next, in step S8, the controller 15 selects a measurement result to be output, based on a measurement value measured in step S4 and a measurement value measured in step S7. The measurement value measured in step S4 may be the digital signal obtained by amplifying and converting the potential difference across both ends of the resistor 12a1, or may be the current value computed based on the digital signal, for example. The measurement value measured in step S7 may be the digital signal obtained by amplifying and converting the potential difference across both ends of the resistors $12a_1$ and $12a_2$, or may be the current value computed based on the digital signal, for example. For example, the controller 15 outputs the measurement result of the range A in a case where the measurement value in the range A is within a measurable range, and outputs the measurement result of the range B in a case where the measurement value in the range A is not within the measurable range. Thus, depending on a state of the DUT 19, even in a case where a large current flows to the DUT 19 and the measurement value in the range A is not within the measurable range, an accurate measurement value can be output because the measurement value in the range B selected in the case where the current supplied to the DUT 19 is relatively large is already obtained. An output mode of the measurement result is preferably a mode in which the user can confirm the measurement result, and may be a mode in which the measurement result is displayed on a display screen of the device inspection apparatus 10, for example.

As described above, according to the first embodiment, the controller 15 controls the detector 13 and the switching device 14, so as to detect the potential difference across both ends of the resistor groups in the ascending order of the combined resistance value across both ends of the resistor groups. That is, the controller 15 controls the detector 13 and the switching device 14, so as to detect the potential difference across both ends of the resistor $12a_1$, and thereafter detect the potential difference across both ends of the resistors $12a_1$ and $12a_2$. Accordingly, the measurement in the range B that is selected in the case where the current supplied to the DUT 19 is relatively large, can be performed within a measurement time in the range A that is selected in the case where the current supplied to the DUT 19 is relatively small. For this reason, the measurement results in the two current ranges (the range A and the range B) can be obtained within the measurement time in the range A. As a result, the device characteristics can be inspected in a short time, regardless of the state of the DUT 19.

Second Embodiment

Device Inspection Apparatus

Figure 4:
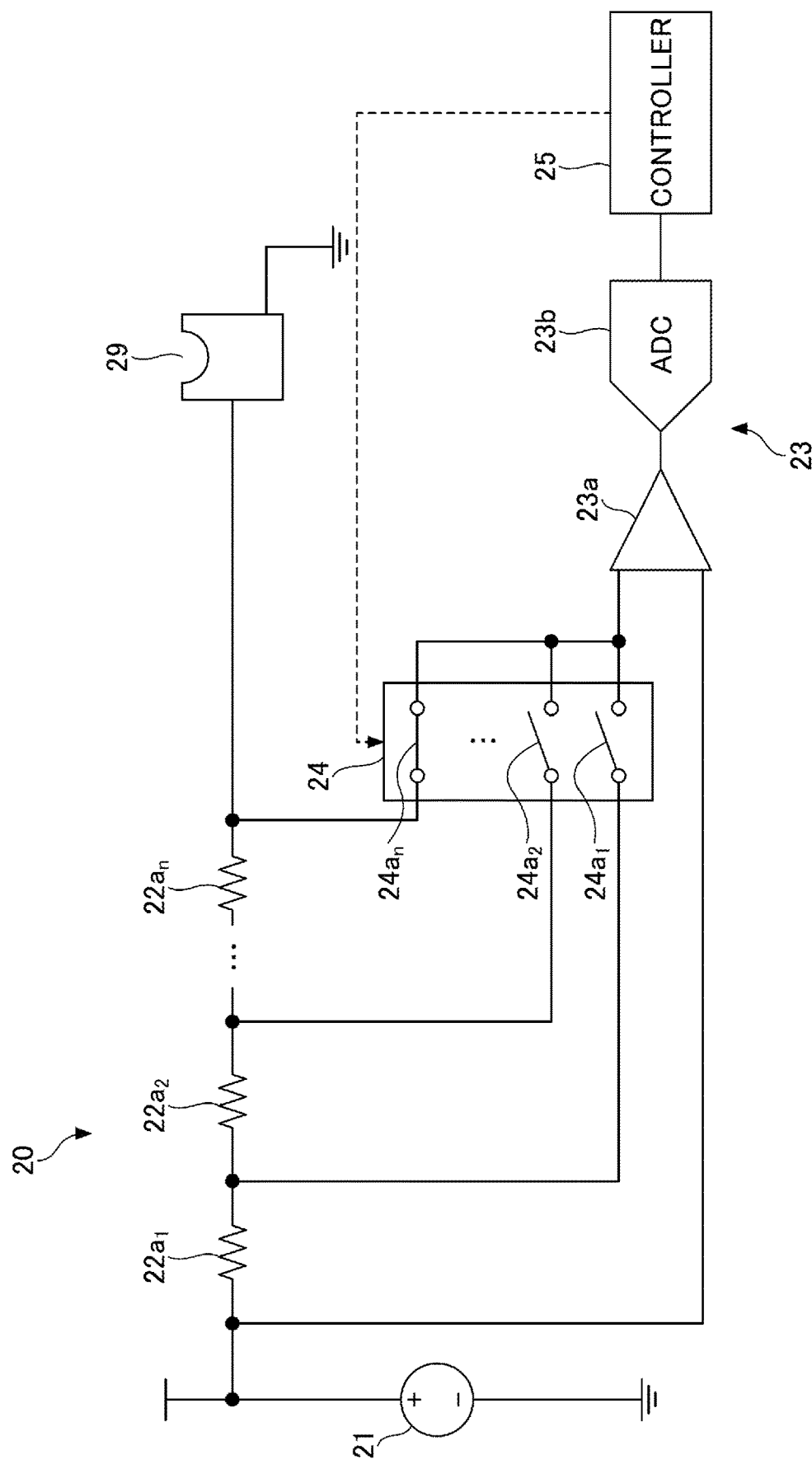
FIG. 4 is a diagram illustrating an example of the electric circuit of the device inspection apparatus according to a second embodiment.

An example of the device inspection apparatus according to a second embodiment will be described, with reference to FIG. 4. The device inspection apparatus according to the second embodiment differs from the device inspection apparatus 10 according to the first embodiment, in that the number of resistor groups is n (n is an integer greater than or equal to three). Hereinafter, differences from the device inspection apparatus 10 according to the first embodiment will mainly be described.

A device inspection apparatus 20 includes a voltage source 21, resistors $22a_1$ through $22a_n$, a detector 23, a switching device 24, a controller 25, or the like.

The voltage source 21 may have a configuration similar to configuration of the voltage source 11.

The resistors $22a$; through $22a$, are connected in series to a DUT 29. That is, the resistors $22a_1$ through $22a_n$ are connected in series between the voltage source 21 and the DUT 29. The resistors $22a_1$ through $22a_n$ are connected in an order of the resistors $22a_1$, $22a_2$, . . . , and $22a_n$ from the voltage source 21 side. The resistors $22a_1$ through $22a_n$ may have identical resistance values or different resistance values.

The detector 23 may have a configuration similar to the configuration of the detector 13, and includes an amplifier 23a, an AD converter 23b, or the like.

The switching device 24 switches a resistor group (the resistor $22a_1$, or the resistors $22a_1$, $22a_2$, . . . , or the resistors $22a_1$, $22a_2$, . . . , and $22a_n$) from which the potential difference is to be detected by the detector 23 that detects the potential difference from the n resistors $22a_1$ through $22a_n$. The switching device 24 includes n switches $24a_1$ through $24a_n$. The switches $24a_1$ through $24a_n$ switch connection states between the DUT 29 side of the resistors $22a_1$, $22a_2$, and $22a_n$, and the amplifier 23a, respectively.

The controller 25 may have a configuration similar to the configuration of the controller 15, and controls operations of the voltage source 21, the detector 23, the switching device 24, or the like. The controller 25 transmits a control signal to the detector 23 and the switching device 24, so as to detect the potential difference across both ends of the resistor groups (the resistor $22a_1$, the resistors $22a_1$, $22a_2$, . . . , and the resistors $22a_1$, $22a_2$, . . . , and $22a_n$) in an ascending order of the combined resistance across both ends of the resistor groups.

Device Inspection Method

The device inspection method according to the second embodiment may be similar to the device inspection method according to the first embodiment. In the device inspection method according to the second embodiment, the controller 25 controls the detector 23 and the switching device 24 to detect the potential difference across both ends of at least two or more different resistor groups among the plurality of resistor groups. In addition, the controller 25 controls the detector 23 and the switching device 24, so as to detect the potential difference across both ends of the resistor groups in the ascending order of the combined resistance value between both ends of the resistor groups.

As described above, according to the second embodiment, the controller 25 controls the detector 23 and the switching device 24, so as to detect the potential difference across both ends of the resistor groups in the ascending order of the combined resistance value between both ends of the resistor groups. Hence, the measurement in a plurality of current ranges can be performed in a short time. As a result, the device characteristics can be inspected in a short time, regardless of the state of the DUT 29.

Third Embodiment

Device Inspection Apparatus

Figure 5:
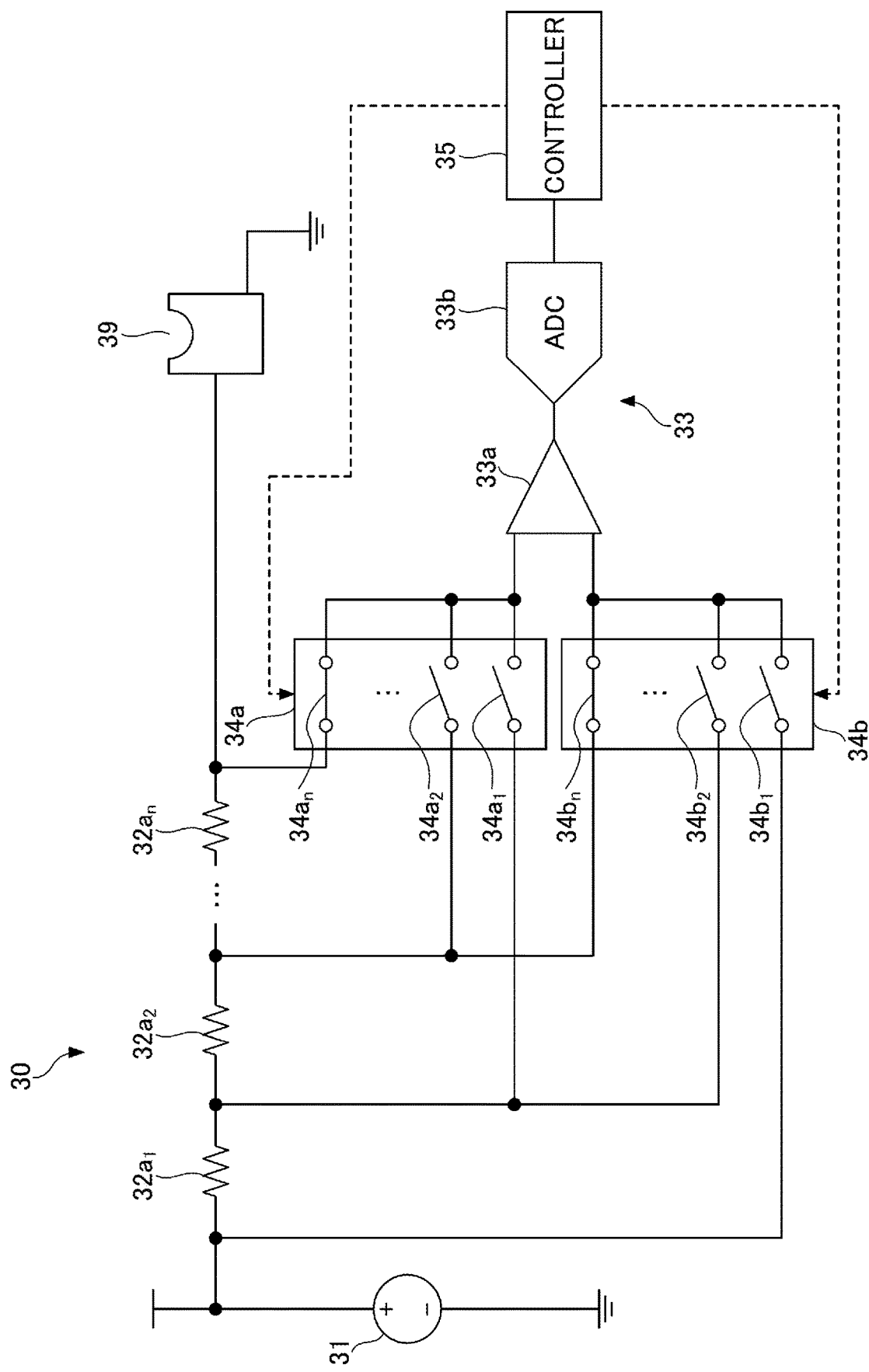
FIG. 5 is a diagram illustrating an example of the electric circuit of the device inspection apparatus according to a third embodiment.

An example of the device inspection apparatus according to a third embodiment will be described, with reference to FIG. 5. The device inspection apparatus according to the third embodiment differs from the device inspection apparatus 20 according to the second embodiment, in that switching devices 34a and 34b for switching connection states between a DUT 39 side of the resistors $32a_1$ through $32a_n$ and the amplifier 33a, and connection states between the voltage source 31 side of the resistors $32a_1$ through $32a_n$ and the amplifier 33a, respectively, are provided. Hereinafter, differences from the device inspection apparatus 20 according to the second embodiment will mainly be described.

A device inspection apparatus 30 includes a voltage source 31, resistors $32a_1$ through $32a_n$, a detector 33, switching devices 34a and 34b, a controller 35, or the like.

The voltage source 31 may have a configuration similar to the configuration of the voltage source 21.

The resistors $32a_1$ through $32a_n$ may have a configuration similar to the configuration of the resistors $22a_1$ through $22a_n$.

The detector 33 may have a configuration similar to the configuration of the detector 23, and includes an amplifier 33a, an AD converter 33b, or the like.

The switching device 34a may have a configuration similar to the configuration of the switching device 24, and includes n switches $34a_1$ through $34a_n$. The switches $34a_1$ through $34a_n$ switch the connection states between the DUT 39 side of the resistors $32a_1$, $32a_2$, . . . , and $32a_n$, and the amplifier 33a, respectively.

The switching device 34b includes n switches $34b_1$ through $34b_n$. The switches $34b_1$ through $34b_n$ switch the connection states between the voltage source 31 side of the resistors $32a_1$, $32a_2$, . . . , and $32a_n$, and the amplifier 33a, respectively.

The controller 35 may have a configuration similar to the configuration of the controller 25, and controls operations of the voltage source 31, the detector 33, the switching devices 34a and 34b, or the like. The controller 35 transmits control signals to the detector 33 and the switching devices 34a and 34b, so as to detect the potential difference across both ends of the resistor groups in an ascending order of the combined resistance value between both ends of the resistor groups.

Device Inspection Method

The device inspection method according to the third embodiment may be similar to the device inspection method according to the second embodiment. In the device inspection method according to the third embodiment, the controller 35 controls the detector 33 and the switching devices 34a and 34b, so as to detect the potential difference across both ends of at least two or more different resistor groups among a plurality of resistor groups. In addition, the controller 35 controls the detector 33 and the switching devices 34a and 34b, so as to detect the potential difference across both ends of the resistor groups in the ascending order of the combined resistance value between both ends of the resistor groups.

As described above, according to the third embodiment, the controller 35 controls the detector 33 and the switching devices 34a and 34b, so as to detect the potential difference across both ends of the resistor groups in the ascending order of the combined resistance value between both ends of the resistor groups. Accordingly, the measurement can be performed in a plurality of current ranges in a short time. As a result, the device characteristics can be inspected in a short time, regardless of the state of the DUT 39.

In addition, according to the third embodiment, the connection states between the DUT 39 side of the plurality of resistors $32a_1$ through $32a_n$ and the amplifier 33a, and the connection states between the voltage source 31 side of the plurality of resistors $32a_1$ through $32a_n$ and the amplifier 33a, are switched by switching the on and off states of the switches $34a_1$ through $34a_n$ and the switches $34b_1$ through $34b_n$, respectively. Thus, a resistor group, including one or more resistors among the plurality of resistors $32a_1$ through $32a_n$, is selected. As a result, because the number of resistor groups that is selected increases, the measurement in a large number of current ranges can be performed using a small number of components.

Fourth Embodiment

Device Inspection Apparatus

Figure 6:
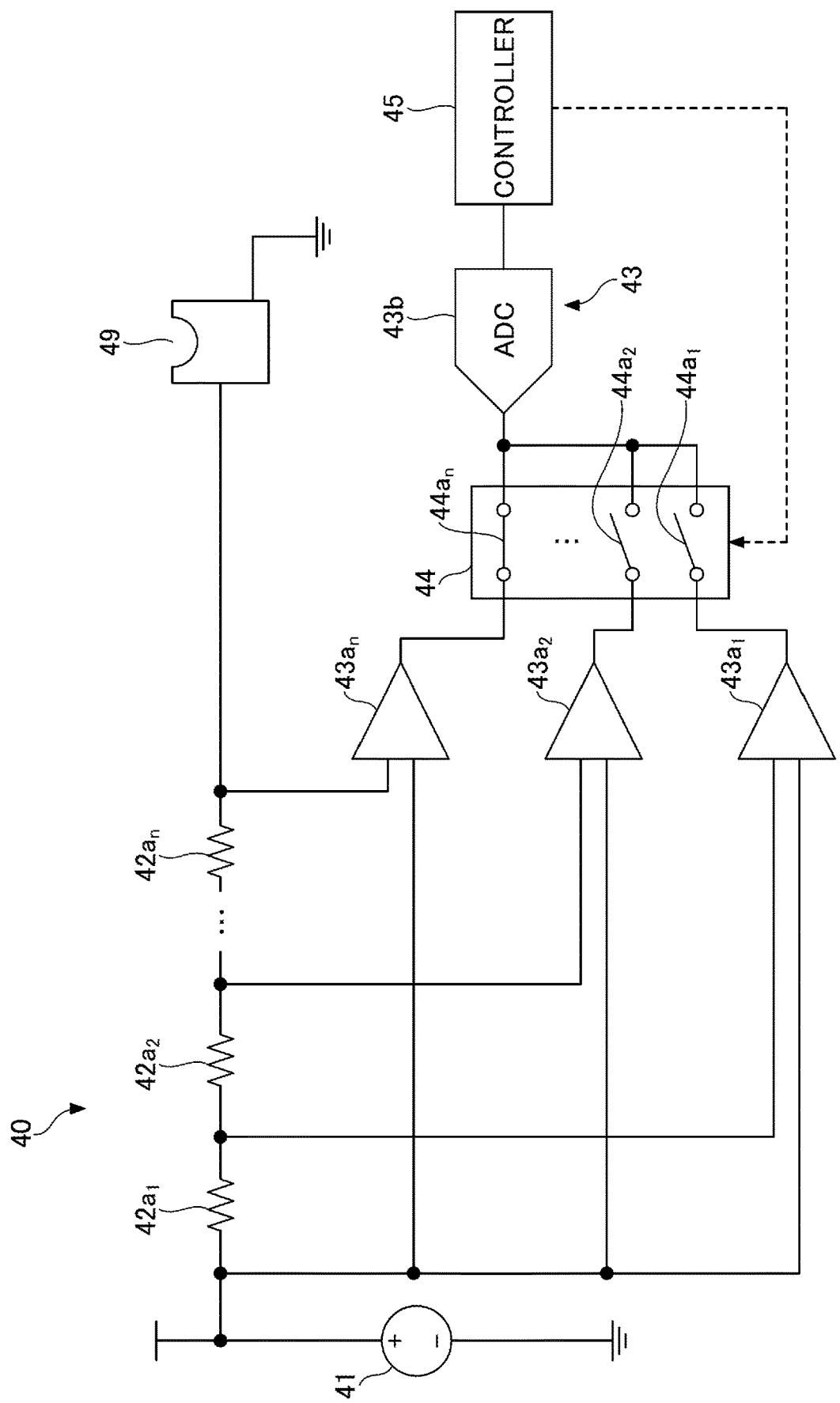
FIG. 6 is a diagram illustrating an example of the electric circuit of the device inspection apparatus according to a fourth embodiment.

An example of the device inspection apparatus according to a fourth embodiment will be described, with reference to FIG. 6. The device inspection apparatus according to the fourth embodiment differs from the device inspection apparatus 20 according to the second embodiment, in that amplifiers $43a_1$ through $43a_n$ are connected between the resistors $42a_1$ through $42a_n$ and the switching device 44, respectively. Hereinafter, differences from the device inspection apparatus 20 according to the second embodiment will mainly be described.

A device inspection apparatus 40 includes a voltage source 41, resistors $42a_1$ through $42a_n$, a detector 43, a switching device 44, a controller 45, or the like.

The voltage source 41 may have a configuration similar to the configuration of the voltage source 21.

The resistors $42a_1$ through $42a_n$ may have a configuration similar to the configuration of the resistors $22a_1$ through $22a_n$.

The detector 43 includes amplifiers $43a_1$ through $43a_n$, an AD converter 43b, or the like.

The amplifiers $43a_1$ through $43a_n$ are connected between the switching device 44 and resistor groups (the resistor $42a_1$, the resistors $42a_1$, $42a_2$, . . . , and the resistors $42a_1$, $42a_2$, . . . , and $42a_n$). The amplifiers $43a_1$ through $43a_n$ amplify potential differences between the voltage source 41 side of the resistor $42a_1$ and a DUT 49 side of the resistor $42a_1$ through $42a_n$, respectively, and output the amplified potential differences to the AD converter 43b via the switching device 44. Hence, small potential differences generated between both ends of the resistor groups (the resistor $42a_1$, the resistors $42a_1$, $42a_2$, . . . , and the resistors $42a_1$, $42a_2$, . . . , and $42a_n$) are amplified and output to the AD converter 43b. As a result, the detection accuracy of the potential differences improves. The amplifiers $43a_1$ through $43a_n$ may be current sense amplifiers, for example.

The AD converter 43b may have a configuration similar to the configuration of the AD converter 23b.

The switching device 44 switches a resistor group (the resistor $42a_1$, the resistors $42a_1$, $42a_2$, ..., or the resistors $42a_1$, $42a_2$, ..., and $42a_n$) from which the potential difference is to be detected by the detector 43 that detects the potential difference from the n resistors $42a_1$ through $42a_n$. The switching device 44 includes n switches $44a_1$ through $44a_n$. The switches $44a_1$ through $44a_n$ switch connection states between the amplifiers $43a_1$ through $43a_n$, and the AD converter 43b, respectively.

The controller 45 may have a configuration similar to the configuration of the controller 25, and controls operations of the voltage source 41, the detector 43, the switching device 44, or the like. The controller 45 transmits control signals to the detector 43 and the switching device 44, so as to detect the potential difference across both ends of the resistor groups (the resistor $42a_1$, the resistors $42a_1$, $42a_2$, ..., and the resistors $42a_1$, $42a_2$, ..., and $42a_n$) in an ascending order of the combined resistance value between both ends of the resistor groups.

Device Inspection Method

The device inspection method according to the fourth embodiment may be similar to the device inspection method according to the second embodiment. In the device inspection method according to the fourth embodiment, the controller 45 controls the detector 43 and the switching device 44 to detect the potential difference across both ends of at least two or more different resistor groups among a plurality of resistor groups. In addition, the controller 45 controls the detector 43 and the switching device 44, so as to detect the potential difference across both ends of the resistor groups in an ascending order of the combined resistance value between both ends of the resistor groups.

As described above, according to the fourth embodiment, the controller 45 controls the detector 43 and the switching device 44, so as to detect the potential difference across both ends of the resistor groups in the ascending order of the combined resistance value between both ends of the resistor groups. Hence, the measurement can be performed in a plurality of current ranges in a short time. As a result, the device characteristics can be inspected in a short time, regardless of the state of the DUT 49.

In the embodiments described above, the controllers 15, 25, 35, and 45 are an example of a controller.

It should be understood that the embodiments disclosed herein are illustrative in all respects and are non-limiting. The embodiments described above may include omissions, substitutions, and modifications in various forms, without departing from the scope and subject matter of the appended claims.

Although the cases where the switching device includes a plurality of switches are described in the embodiments above, the present disclosure is not limited to such cases. For example, the switching device may be configured to include a multiplexer.

The present international application is based upon and claims priority to Japanese Patent Application No. 2021-072503, filed on Apr. 22, 2021, the entire contents of which are incorporated herein by reference.

DESCRIPTION OF REFERENCE NUMERALS 10, 20, 30, 40: Device inspection apparatus
11, 21, 31, 41: Voltage source
$12a_1$ through $12a_2$, $22a_1$ through $22a_n$, $32a_1$ through $32a_n$, $42a_1$ through $42a_n$: Resistor
14, 24, 34a, 34b, 44: Switch
15, 25, 35, 45: Controller

The invention claimed is:

1. A device inspection apparatus comprising:
   a voltage source configured to apply a voltage to a device to be inspected;
   a plurality of resistors coupled in series between the voltage source and the device;
   a detector configured to detect a potential difference across respective ends of a resistor group that includes one or more resistors among the plurality of resistors;
   a switching device configured to switch the resistor group from which the detector detects the potential difference among the plurality of resistors; and
   a controller configured to:
      control the detector and the switching device to detect a potential difference across respective ends of at least two different resistor groups, and
      control the detector and the switching device to detect the potential difference in an ascending order of a combined resistance value between respective ends of the at least two or more resistor groups, wherein:
   in a state where the controller controls the voltage source to supply a current to all resistors of the plurality of resistors and the current is supplied to all resistors of the plurality of resistors, the switching device selects a resistor group having a smallest combined resistance, and the detector detects a potential difference across respective ends of the resistor group having the smallest combined resistance after a first time elapses, the switching device next selects a resistor group having a combined resistance larger than the smallest combined resistance, and the detector detects a potential difference across respective ends of the resistor group having the combined resistance larger than the smallest combined resistance after a second time elapses, and
   the first time and the second time start when the current starts to flow through all resistors of the plurality of resistors.

2. The device inspection apparatus as claimed in claim 1, wherein the detector includes an amplifier provided between the switching device and the controller or the at least two resistor groups.

3. The device inspection apparatus as claimed in claim 1, wherein the switching device is configured to switch only the device side of the at least two resistor groups.

4. The device inspection apparatus as claimed in claim 1, wherein the switching device is configured to switch the voltage source side and the device side of the at least two resistor groups.

5. The device inspection apparatus as claimed in claim 1, wherein the controller is configured to output a value according to one potential difference selected from a plurality of potential differences detected by the detector.

6. The device inspection apparatus as claimed in claim 1, wherein the controller is configured to compute a current supplied to the device based on the potential difference detected by the detector.

7. A device inspection method for inspecting a device to be inspected by applying a voltage to the device via a plurality of resistors coupled in series, the device inspection method comprising:
   detecting a potential difference across respective ends of a plurality of resistor groups including one or more resistors among the plurality of resistors, in an ascending order of a combined resistance value between respective ends of the plurality of resistor groups, wherein:

the detecting includes, in a state where a current is supplied to all resistors of the plurality of resistors, selecting a resistor group having a smallest combined resistance, and detecting a potential difference across respective ends of the resistor group having the smallest combined resistance after a first time elapses, next selecting a resistor group having a combined resistance larger than the smallest combined resistance, and detecting a potential difference across respective ends of the resistor group having the combined resistance larger than the smallest combined resistance after a second time elapses, and the first time and the second time start when the current starts to flow through all resistors of the plurality of resistors.

8. The device inspection method as claimed in claim 7, further comprising:

switching, by a switching device that switches a resistor group from which a detector detects the potential difference, only the device side of the resistor group from which the detector detects the potential difference.

9. The device inspection method as claimed in claim 7, further comprising:

switching, by a switching device that switches a resistor group from which a detector detects the potential difference, a voltage source side of a voltage source that applies the voltage to the device, and the device side of the resistor group from which the detector detects the potential difference.

10. The device inspection method as claimed in claim 7, further comprising:

outputting, by a controller, a value according to one potential difference selected from a plurality of potential differences detected by a detector that detects the potential difference.

11. The device inspection method as claimed in claim 7, further comprising:

computing, by a controller, a current supplied to the device based on the potential difference detected by a detector that detects the potential difference.

* * * * *